US011958115B2

(12) United States Patent
Mehrotra et al.

(10) Patent No.: US 11,958,115 B2
(45) Date of Patent: Apr. 16, 2024

(54) GRADE POWDERS AND SINTERED CEMENTED CARBIDE COMPOSITIONS

(71) Applicant: Kennametal Inc., Latrobe, PA (US)

(72) Inventors: Pankaj K. Mehrotra, Greensburg, PA (US); Pankaj B. Trivedi, Greensburg, PA (US); Kent P. Mizgalski, Stahlstown, PA (US)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 17/185,240

(22) Filed: Feb. 25, 2021

(65) Prior Publication Data

US 2021/0178476 A1 Jun. 17, 2021

Related U.S. Application Data

(63) Continuation of application No. 15/675,078, filed on Aug. 11, 2017, now Pat. No. 10,940,538.

(51) Int. Cl.

| | |
|---|---|
| *B22F 3/16* | (2006.01) |
| *B22F 1/148* | (2022.01) |
| *B22F 3/02* | (2006.01) |
| *B22F 3/10* | (2006.01) |
| *B22F 9/02* | (2006.01) |
| *B22F 9/04* | (2006.01) |
| *C04B 35/56* | (2006.01) |
| *C22C 29/08* | (2006.01) |
| *B22F 9/00* | (2006.01) |

(52) U.S. Cl.
CPC ............... *B22F 3/02* (2013.01); *B22F 1/148* (2022.01); *B22F 3/10* (2013.01); *B22F 3/16* (2013.01); *B22F 9/026* (2013.01); *B22F 9/04* (2013.01); *C04B 35/5626* (2013.01); *C22C 29/08* (2013.01); *B22F 2009/001* (2013.01); *B22F 2009/043* (2013.01); *B22F 2201/20* (2013.01); *B22F 2301/15* (2013.01); *B22F 2302/10* (2013.01); *B22F 2998/10* (2013.01); *B22F 2999/00* (2013.01); *C04B 2235/404* (2013.01); *C04B 2235/405* (2013.01)

(58) Field of Classification Search
None
See application file for complete search history.

(56) References Cited

U.S. PATENT DOCUMENTS

| | | | |
|---|---|---|---|
| 3,551,991 A * | 1/1971 | Reich ........................ | B22F 3/26 428/545 |
| 3,647,401 A * | 3/1972 | Meadows ................ | C22C 29/08 75/229 |
| 3,953,194 A | 4/1976 | Hartline, III et al. | |
| 4,234,333 A | 11/1980 | Ghandehari et al. | |
| 4,349,423 A | 9/1982 | Nutzel et al. | |
| 4,466,945 A * | 8/1984 | Cheney ................... | C22C 29/06 75/588 |
| 4,497,660 A | 2/1985 | Lindholm | |
| 4,684,405 A | 8/1987 | Kolaska et al. | |
| 5,380,408 A | 1/1995 | Svensson | |
| 5,384,016 A | 1/1995 | Lin et al. | |
| 5,728,197 A | 3/1998 | Seegopaul et al. | |
| 5,948,541 A | 9/1999 | Inspektor | |
| 6,267,867 B1 | 7/2001 | Olson | |
| 6,852,304 B2 | 2/2005 | Yaginuma et al. | |
| 9,656,873 B2 | 5/2017 | Mehrotra et al. | |
| 10,940,538 B2 * | 3/2021 | Mehrotra ................. | B22F 3/02 |
| 2012/0328506 A1 | 12/2012 | Ito et al. | |
| 2014/0361601 A1 | 12/2014 | Bush et al. | |
| 2015/0063930 A1 | 3/2015 | Hedin et al. | |
| 2015/0139872 A1 * | 5/2015 | Mehrotra .............. | C01B 32/949 423/53 |
| 2016/0208398 A1 | 7/2016 | Nie et al. | |
| 2017/0209933 A1 * | 7/2017 | Wang ....................... | C22B 5/04 |

FOREIGN PATENT DOCUMENTS

| | | | |
|---|---|---|---|
| CN | 101824539 A | | 9/2010 |
| CN | 101863472 A | * | 10/2010 |
| CN | 102443728 A | | 5/2012 |
| CN | 102443729 A | | 5/2012 |
| CN | 103773959 A | | 8/2016 |
| CN | 106086571 A | | 12/2017 |
| CN | 105714171 A | | 3/2019 |
| GB | 2542948 A | | 1/2018 |
| GB | 2542948 B | | 1/2018 |
| IN | 212662 | | 12/2007 |
| JP | 2009179818 A | | 8/2009 |
| JP | 2011179039 A | | 9/2011 |
| TW | 280839 B | | 7/1996 |
| UA | 104121 U | | 1/2016 |
| WO | WO-2023024162 A1 | * | 3/2023 |

OTHER PUBLICATIONS

English translation of CN 101863472 (originally published Oct. 20, 2010) obtained from PE2E search.*
Kurasha, Jaquiline T., "Production of Cemented Tungsten Carbide Alloys Using Zinc Recycled Tungsten Carbide Tool Grade Scrap Metal", 2017, University of the Witwatersrand, Master dissertation. oai:wiredspace.wits.ac. za:10539/24236.
May 22, 2021 Office Action (non-US) CN App. No. 109385523A.
Nov. 4, 2020 Notice of Allowance US App. No. 20190047051A1.
Aug. 24, 2020 Final Office Action (US Only) US App. No. 20190047051A1.
Feb. 10, 2020 Office action (3 months) (US Only) US App. No. 20190047051A1.
Jan. 29, 2020 Office Action (non-US) DE App. No. 102018116728.
Oct. 28, 2019 Office action (3 months) (US Only) US App. No. 20190047051A1.
May 22, 2019 Office action (3 months) (US Only) US App. No. 20190047051A1.
English Translation May 22, 2021 Office Action (non-US) CN App. No. 109385523A.
Feb. 16, 2022 Office Action (non-US) CN App. No. 109385523A.
May 7, 2014 English Translation of CN Application No. 20141012099 (CN103773959) from Espacenet, 09 Pages.
Jul. 14, 2023 Foreign Office Action German Application No. DE201810116728 (Pub. No. DE102018116728), 18 Pages.

* cited by examiner

Primary Examiner — George Wyszomierski
(74) Attorney, Agent, or Firm — Larry R. Meenan

(57) ABSTRACT

In one aspect, grade powder compositions are described herein comprising electrochemically processed sintered carbide scrap. In some embodiments, a grade powder composition comprises a reclaimed powder component in an amount of at least 75 weight percent of the grade powder composition, wherein the reclaimed carbide component comprises electrochemically processed sintered carbide scrap.

20 Claims, No Drawings

GRADE POWDERS AND SINTERED CEMENTED CARBIDE COMPOSITIONS

RELATED APPLICATION DATA

The present application is a continuation application pursuant to 35 U.S.C. § 120 of U.S. patent application Ser. No. 15/675,078 filed Aug. 11, 2017.

FIELD

The present invention relates to grade powders and associated sintered cemented carbide compositions and, in particular, to grade powders and sintered cemented carbide compositions comprising electrochemically processed sintered carbide scrap.

BACKGROUND

Tungsten is an industrially significant metal finding application in a variety of fields with particular emphasis in the tooling industry. The high hardness, heat resistance and wear resistance of tungsten and its carbide form make it an ideal candidate for use in cutting tools, mining and civil engineering tools and forming tools, such as molds and punches. Cemented tungsten carbide tools, for example, account for the majority of worldwide tungsten consumption. According a 2007 United States Geological Survey, mineral deposits of tungsten resources totaled in the neighborhood of nearly 3 million tons. At current production levels, these resources will face exhaustion within the next forty years. Moreover, a handful of nations control the majority of worldwide tungsten deposits. China, for example, controls approximately 62% of tungsten deposits and accounts for 85% of ore production volume.

Given the limited supply of tungsten and its inequitable global distribution, significant resources have been invested in the development of processes for recycling scrap tungsten carbide compositions. For example, hydrometallurgy tungsten recycling processes have been developed where tungsten carbide scrap is roasted with molten sodium nitrate ($NaNO_3$) to generate water soluble $Na_2WO_4$. The $Na_2WO_4$ undergoes conversion to several different chemical species ending in an aqueous solution of $(NH_4)_2WO_4$. Ammonium paratungstate (APT) can be easily converted to tungsten oxide ($WO_3$) by roasting and subsequently carburized to tungsten carbide (WC). This recycling process, however, demonstrates several disadvantages including numerous processing steps, high chemical consumption and high energy consumption. Therefore, profitability is limited until large scale production is achieved.

An alternative process for recycling WC scrap employs molten zinc metal. In this process, cemented carbide scrap is mixed with zinc ingots in a tray, and the mixture is heated in a furnace to liquefy the zinc. The liquefied zinc permeates the WC scrap reacting with the metallic binder phase. The zinc is subsequently volatilized leaving behind a porous WC that is crushed into powder form. This zinc treatment process also suffers significant disadvantages. Liquefication of the zinc, for example, requires high energy consumption. More troubling, however, is the dirty state of the resulting porous WC. Zinc treatment does not remove impurities in the WC composition such as metal carbide grain growth inhibitors and metallic binder. Such impurities result in inferior mechanical and chemical properties, thereby limiting use of the recycled WC composition in the fabrication of new tooling.

SUMMARY

In one aspect, grade powder compositions are described herein comprising electrochemically processed sintered carbide scrap. In contrast to other reclamation or recycling techniques, electrochemical processing can remove substantial amounts of metallic binder and other impurities from the sintered carbide scrap. Removal of these impurities provides significant flexibility to combine the electrochemically processed sintered carbide scrap with fresh powder metallic binder and other components to provide new grade powder compositions for production of sintered cemented carbide parts. In some embodiments, for example, a grade powder composition comprises a reclaimed carbide powder component in an amount of at least 70 weight percent of the grade powder composition, wherein the reclaimed carbide powder component comprises electrochemically processed sintered carbide scrap. The electrochemically processed sintered carbide scrap can comprise tungsten carbide. In some embodiments, the reclaimed carbide powder component consists essentially of the electrochemically processed sintered carbide scrap. The grade powder composition can also comprise powder metallic binder.

In another aspect, sintered cemented carbide articles are described herein. A sintered cemented carbide article comprises a reclaimed carbide phase in an amount of at least 70 weight percent of the sintered article, the reclaimed carbide phase comprising electrochemically processed sintered carbide scrap. In some embodiments, the reclaimed carbide phase consists essentially of the electrochemically processed sintered carbide scrap. The sintered cemented carbide article also comprises metallic binder. Moreover, the sintered cemented carbide article can exhibit fracture toughness of 5-20 ksi($in^{1/2}$), in some embodiments. The sintered cemented carbide article may also have transverse rupture strength of 250-650 ksi.

In another aspect, methods of making sintered cemented carbide articles are provided. In some embodiments, a method of making a sintered cemented carbide article comprises providing a grade powder composition comprising powder metallic binder and a reclaimed carbide powder component in an amount of at least 70 weight percent of the grade powder composition, the reclaimed carbide powder component comprising electrochemically processed sintered carbide scrap. The grade powder composition is formed into a green article, and the green article is sintered to provide the sintered cemented carbide article.

These and other embodiments are further described in the following detailed description.

DETAILED DESCRIPTION

Embodiments described herein can be understood more readily by reference to the following detailed description and examples and their previous and following descriptions. Elements and apparatus described herein, however, are not limited to the specific embodiments presented in the detailed description. It should be recognized that these embodiments are merely illustrative of the principles of the present invention. Numerous modifications and adaptations will be readily apparent to those of skill in the art without departing from the spirit and scope of the invention.

I. Grade Powder Compositions

In one aspect, grade powder compositions are described herein comprising electrochemically processed sintered carbide scrap. In some embodiments, a grade powder composition comprises a reclaimed carbide powder component in an amount of at least 70 weight percent or at least 75 weight percent of the grade powder composition, wherein the reclaimed carbide powder component comprises electrochemically processed sintered carbide scrap. In some embodiments, the reclaimed carbide powder component is present in an amount of 80-99 weight percent or 90-99 weight percent of the grade powder composition. The grade powder composition also comprises powder metallic binder.

Turning now to specific components, the reclaimed carbide powder component comprises electrochemically processed sintered carbide scrap. As described herein, electrochemical processing can remove substantial amounts of metallic binder and/or other impurities from the sintered carbide scrap. In some embodiments, the electrochemically processed sintered carbide scrap has physical, mechanical and/or chemical properties substantially similar to virgin carbide. Accordingly, significant flexibility exists to combine the electrochemically processed sintered carbide scrap with fresh powder metallic binder and other components to provide new grade powder compositions for production of sintered cemented carbide parts. In some embodiments, the electrochemically processed sintered carbide scrap is limited to tungsten carbide particles. In other embodiments, the electrochemically processed sintered carbide scrap comprises tungsten carbide and one or more metal carbides selected from the group consisting of Group IVB metal carbides, Group VB metal carbides and Group VIB metal carbides.

The electrochemically processed sintered carbide scrap can have any average particle size not inconsistent with the objectives of the present invention. In some embodiments, the electrochemically processed sintered carbide scrap has an average particle size of 0.5 µm to 30 µm. In other embodiments, the electrochemically processed sintered carbide scrap has an average particle size of 1 µm to 5 µm. Desired particle size of the electrochemically processed sintered carbide scrap can be achieved by milling the sintered carbide scrap with powder metallic binder in the production of the grade powder. The milled grade powder can be spray dried or vacuum dried and granulated to provide free-flowing powder aggregates of various shape, including spherical shape. Alternatively, the grade powder can be vacuum dried to provide powder suitable for isostatic compaction. In some embodiments, the electrochemically processed sintered carbide scrap can be crushed or otherwise comminuted prior to milling with the metallic binder. Sintered carbide scrap can be processed by a variety of electrochemical techniques including, but not limited, to the electrochemical techniques described in U.S. Pat. No. 9,656,873 which is incorporated herein by reference in its entirety. Electrochemically processed sintered carbide scrap is also available from various commercial sources including Global Tungsten and Powders Corporation of Towanda, Pennsylvania.

In some embodiments, the reclaimed carbide powder component consists essentially of the electrochemically processed sintered carbide scrap. For example, in one embodiment, the electrochemically processed sintered carbide scrap is the sole species of the reclaimed powder component. Alternatively, the reclaimed carbide powder component comprises electrochemically processed sintered carbide scrap and sintered carbide scrap processed by one or more different reclamation methods. In some embodiments, APT processed and/or zinc processed sintered carbide scrap can be combined or mixed with electrochemically processed sintered carbide scrap to provide the reclaimed carbide powder component of the grade powder composition. The electrochemically processed sintered carbide scrap can be mixed with other reclaimed sintered carbide scrap in any amount not inconsistent with the objectives of the present invention. Amount of electrochemically processed sintered carbide scrap in the reclaimed carbide powder component can be selected according to several considerations including the desired mechanical and chemical properties of articles formed from the grade powder and the compositional identity of other powders in the reclaimed carbide powder component. In some embodiments, electrochemically processed sintered carbide scrap is present in an amount of 50-100 weight percent of the reclaimed carbide component. Electrochemically processed sintered carbide scrap can also be present in the reclaimed carbide powder component at a weight percent selected from Table I. The remaining weight percent of the reclaimed carbide powder component is filled by other reclaimed sintered carbide scrap, such as APT and/or zinc processed sintered carbide scrap.

TABLE I

| wt. % of Electrochemically Processed Sintered Carbide Scrap |
|---|
| 40-99 |
| 50-85 |
| 50-75 |
| 60-90 |
| 70-95 |

In some embodiments, the grade powder can further include a virgin carbide component. The virgin carbide component can comprise carbides, nitrides and/or carbonitrides of one or more metals selected from Groups IVB, VB and VIB of the Periodic Table. In being virgin, the metal carbides, nitrides and/or carbonitrides have not previously been part of a sintered carbide composition. In some embodiments, the virgin carbide component comprises at least one of tungsten carbide, tantalum carbide, niobium carbide, vanadium carbide, chromium carbide, zirconium carbide, hafnium carbide, titanium carbide and solid solutions thereof. The virgin carbide component can be present in the grade powder composition in any amount not inconsistent with the objectives of the present invention. Amount of virgin carbide component can be selected according to several considerations including, but not limited to, desired mechanical and chemical properties of sintered articles formed of the grade powder and specific compositional identity of the reclaimed carbide powder component. In some embodiments, the virgin carbide component is present in an amount of 0-20 weight percent of the grade composition, such as 0.1-20 weight percent.

The grade composition also comprises powder metallic binder. The powder metallic binder can comprise one or more transition metals, including metals of Group VIIIB of the Periodic Table. In some embodiments, for example, the powder metallic binder is cobalt or cobalt-based alloy. Power cobalt-based alloy binder, in some embodiments, comprises a cobalt-transition metal alloy. For example, transition metal of the binder alloy can be selected from the group consisting of molybdenum, ruthenium, rhenium, rhodium, platinum, palladium, manganese, copper, iron, nickel and combinations thereof. In other embodiments, powder cobalt-based metallic binder comprises silicon and/or aluminum. The powder metallic binder can be present in the grade powder in any amount not inconsistent with the objectives of the present invention. The metallic binder can be present in an amount of 1 weight percent to 30 weight percent of the grade powder composition. In some embodiments, metallic binder is present in the grade powder composition in an amount selected from Table II.

TABLE II

Amount of Co-based metallic binder (wt. %)

1-25
5-20
5-15
10-15
12-14

The powder metallic binder coats carbide components of the grade powder composition, including individual particles of the reclaimed carbide powder component and virgin carbide component, if present.

II. Sintered Cemented Carbide Articles

In another aspect, sintered cemented carbide articles formed from grade powder compositions described in Section I herein are provided. A sintered cemented carbide article, for example, comprises a reclaimed carbide phase in an amount of at least 70 weight percent of the sintered article, the reclaimed carbide phase comprising electrochemically processed sintered carbide scrap. The sintered cemented carbide article also comprises metallic binder. The sintered cemented carbide articles can comprise any of the grade powder composition properties described in Section I. For example, the reclaimed carbide phase can be present in an amount of 80-99 weight percent or 90-99 weight percent of the sintered cemented carbide article. Moreover, the reclaimed carbide phase can consist essentially of electrochemically processed sintered carbide scrap. Alternatively, the reclaimed carbide phase can comprise electrochemically processed sintered carbide scrap in an amount selected from Table I, wherein the balance is filled by other reclaimed sintered carbide scrap, such as APT and/or zinc processed sintered carbide scrap. In some embodiments, the sintered cemented carbide article comprises a virgin powder phase, as described in Section I.

Additionally, the reclaimed carbide phase of sintered cemented carbide articles can have an average grain size of 0.5 to 15 μm. In some embodiments, average grain size of the reclaimed carbide phase is 1-10 μm or 0.5-5 μm. In other embodiments, average grain size of the reclaimed carbide phase is greater than 15 μm. Grain size of the reclaimed carbide phase can be selected according to several considerations including, but not limited to, the desired mechanical properties of the sintered cemented carbide article and intended use of the sintered cemented carbide article.

As described herein, sintered cemented carbide articles also comprise metallic binder. Compositional identity of the metallic binder is provided in Section I herein. Additionally, metallic binder can be present in a sintered cemented carbide article in an amount selected from Table II.

Sintered cemented carbide articles employing reclaimed carbide powders described herein may exhibit properties comparable to sintered articles formed solely from virgin carbide powder compositions. In some embodiments, for example sintered cemented carbide articles described herein exhibit a fracture toughness generally ranging from 5 to 20 ksi(in)$^{1/2}$ according to ASTM B771 Standard Test Method for Short Rod Fracture Toughness of Cemented Carbides. A sintered cemented carbide article, in some embodiments, has a fracture toughness selected from Table III.

TABLE III

Fracture Toughness [ksi(in)$^{1/2}$] - ASTM B771

10-20
11-18
12-17
10-15
12-14

In addition to fracture toughness, sintered cemented carbide articles described herein can exhibit transverse rupture strength of 250-650 ksi according to ASTM B406—Standard Test Method of Transverse Rupture Strength of Cemented Carbides. In some embodiments, a sintered cemented carbide article has a transverse rupture strength selected from Table IV.

TABLE IV

Transverse Rupture Strength (ksi)

300-650
350-600
400-600
500-650

Sintered cemented carbide articles described herein can exhibit hardness of at least 80 HRA. In some embodiments, a sintered cemented carbide article has hardness of 80-95 HRA. Additionally the sintered cemented carbide articles can have density of 14-15 g/cm$^3$. For example, a sintered cemented carbide article can have density of 14.1-14.8 g/cm$^3$. Further, sintered cemented carbide articles described herein can be free or substantially free of lower carbide phases, including eta phase [(CoW)C], $W_2C$ and/or $W_3C$. In some embodiments, sintered cemented carbide articles described herein are free of at least one of A-type porosity and B-type porosity. Moreover, sintered cemented carbide articles described herein can be free of free graphite (C-type porosity). In some embodiments, for example, a sintered cemented carbide article has a porosity designation of A00B00C00.

Sintered cemented carbide articles described herein can be cutting elements or components of cutting elements for various applications. In some embodiments, sintered cemented carbide articles include cutting inserts for machining metal or alloys. In other embodiments, sintered cemented carbide articles comprise interrupted cut tooling such as drills, end mills and/or milling inserts. Additionally, sintered cemented carbide articles described herein can be combined with ultrahard materials including polycrystalline diamond (PCD), diamond, diamond-like carbon (DLC), cubic boron nitride and polycrystalline cubic boron nitride. For example, sintered cemented carbide articles described herein can serve as a substrate or support to which PCD is sintered in a high temperature, high pressure process. In such embodiments, the layer of PCD can provide enhanced wear resistance leading to increased lifetimes of cutting elements and/or wear parts employing sintered cemented carbide compositions described herein. In some embodiments, sintered cemented carbide articles include earth boring and/or mining apparatus including earth boring bodies, bits and cutters.

III. Methods of Making Sintered Cemented Carbide Articles

In another aspect, methods of making sintered cemented carbide articles are provided. In some embodiments, a method of making a sintered cemented carbide article comprises providing a grade powder composition comprising a reclaimed carbide powder component in an amount of at least 70 weight percent of the grade powder composition, the reclaimed carbide component comprising electrochemically processed sintered carbide scrap. The grade powder composition also comprises metallic binder. The grade powder composition is formed into a green article, and the green article is sintered to provide the sintered cemented carbide article. Grade powder compositions can have any composition and/or properties described in Section I above. Additionally, sintered cemented carbide articles formed according to methods described herein can have any composition and/or properties described in Section II above.

The grade powder composition, in some embodiments, is provided by mixing the reclaimed carbide powder component and the powder metallic binder. When desired, virgin carbide powder component can be added to the mixture of the reclaimed carbide powder component and powder metallic binder. The reclaimed carbide powder component, metallic binder and the optional virgin carbide component can be present in the mixture in amounts described in Section I. The resulting mixture can be milled in a ball mill or attritor. Milling of the mixture can result in particles of the reclaimed carbide component being coated with powder metallic binder. When present, particles of the virgin carbide component are also coated with powder metallic binder.

The grade powder is formed or consolidated into a green article in preparation for sintering. Any consolidation method can be employed not inconsistent with the objectives of the present invention. The grade powder, for example, can be molded, extruded or pressed into a green article. In several specific embodiments, the grade powder can be pill pressed or cold-isostatic pressed into the green article. In some embodiments, the grade powder is consolidated into a green article by one or more additive manufacturing techniques. Additive manufacturing techniques contemplated herein include, but are not limited to, binder jetting, material jetting, laser powder bed, electron beam powder bed and directed energy deposition as described in ASTM F-42. The green article can take the form of a blank or can assume near-net shape form of the desired cutting element, including cutting insert, drill or endmill. In some embodiments, the green article is mechanically worked to provide the desired shape.

The green article is subsequently sintered to provide the article formed of sintered cemented carbide. The green article can be vacuum sintered or sintered under an argon or hydrogen/methane atmosphere. During vacuum sintering, the green article is placed in a vacuum furnace and sintered at temperatures of 1320° C. to 1500° C. In some embodiments, hot isostatic pressing (HIP) is added to the vacuum sintering process. Hot isostatic pressing can be administered as a post-sinter operation or during vacuum sintering yielding a sinter-HIP process. The resulting sintered cemented carbide article can exhibit and fracture toughness and transverse rupture strength values described herein.

In some embodiments, sintered cemented carbide articles having composition and properties described herein are coated with one or more refractory materials by PVD and/or CVD. In some embodiments, the refractory coating comprises one or more metallic elements selected from aluminum and metallic elements of Groups IVB, VB and VIB of the Periodic Table and one or more non-metallic elements selected from Groups IIIA, IVA, VA and VIA of the Periodic Table. For example, the refractory coating can comprise one or more carbides, nitrides, carbonitrides, oxides or borides of one or more metallic elements selected from aluminum and Groups IVB, VB and VIB of the Periodic Table. Additionally, the coating can be single-layer or multi-layer.

These and other embodiments are further illustrated by the following non-limiting examples.

Example 1—Sintered Cemented Carbide Articles

Sintered cemented carbide articles of chemical composition listed in Table V were fabricated as follows. About 88 weight percent of tungsten carbide required for production of a sintered cemented carbide article came from electrochemically processed sintered WC scrap. The remaining 12 weight percent of the tungsten carbide component came from zinc reclaimed tungsten carbide. No virgin tungsten carbide was used in the sintered cemented carbide bodies of the present example. Properties of the electrochemically processed WC scrap used are provided in Table VI.

TABLE V

Sintered Cemented Carbide Composition (wt. %)

| Ta | Ti | Nb | Co | WC |
|---|---|---|---|---|
| 1.8 | 0.4 | 0.3 | 6 | Bal. |

TABLE VI

Composition of Electrochemically Processed WC (wt. %)

| Ta | Ti | Nb | Co | Fe | Cr | V | WC |
|---|---|---|---|---|---|---|---|
| 0.02 | 0.01 | 0 | 0.3 | — | 0.11 | — | Bal. |

Average particle size of the electrochemically processed WC scrap was approximately 2 μm. The grade powder composition comprising the electrochemically processed sintered tungsten carbide scrap, zinc reclaimed tungsten carbide and fresh powder cobalt binder was ball milled for 11 hours in heptane and spray dried to produce granules suitable for pressing. Green blanks were pressed using the grade powder and vacuum sintered at 1482° C. for 45 minutes to produce fully dense compacts. Physical, microstructural and mechanical properties of the compacts were comparable to sintered carbides made using virgin powder and are reported in Table VII.

TABLE VII

Properties of Sintered Cemented Carbide

| Density (g/cm$^3$) | MS (%) | Hc, Oe | Porosity | Pits & Flaw | Anomalies | HRA | TRS (ksi) |
|---|---|---|---|---|---|---|---|
| 14.64 | 88.2 | 243 | A02 + B00 + C00 | 0 | 0 | 92.5 | 349 |

Example 2—Sintered Cemented Carbide Articles

Sintered cemented carbide articles of chemical composition listed in Table VIII were fabricated as follows.

TABLE VIII

Composition of Sintered Cemented Carbide Articles (wt. %)

| Co | Cr | WC |
|---|---|---|
| 6 | 0.4 | Bal. |

In Batch I, 100 weight percent of tungsten carbide required for the production of cemented carbides article came from electrochemically processed sintered WC scrap. No other source of tungsten carbide was used in the production of the cemented carbide articles. Properties of electrochemically processed WC scrap are the same as provided in Table VI in Example 1. For comparison, Batch II was made side by side where 88 weight percent of the required tungsten carbide was virgin WC and the remaining 12 weight percent came from zinc reclaimed WC. Grade powders of Batch I and Batch II were each ball milled in heptane and spray dried to produce granules suitable for pressing. Batch I was ball milled for 65 hours and Batch II was ball milled for 75 hours to achieve the coercive force specification for the grade. Green blanks were pressed from Batch I and Batch II and vacuum sintered at 1482° C. for 45 minutes to produce fully dense compacts. Physical, microstructural and mechanical properties of the sintered compacts of Batch I and Batch II are provided in Table IX.

TABLE IX

Properties of Sintered Cemented Carbide

| Batch | Density (g/cm$^3$) | MS % | Hc, Oe | Porosity | Pits & Flaw | Anomalies | HRA | TRS (ksi) |
| --- | --- | --- | --- | --- | --- | --- | --- | --- |
| I | 14.80 | 90.9 | 261 | A00 + B00-5 | 0 | 2 | 92.9 | 524.6 |
| II | 14.85 | 88.3 | 260 | A00 + B00-9 | 2 | 2 | 93.0 | 510.7 |

As provided in Table IX, the sintered cemented carbide articles of Batch I comprising electrochemically processed WC scrap exhibited properties substantially equivalent to the sintered cemented carbide articles of Batch II employing 88 weight percent virgin WC.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A grade powder composition comprising:
a reclaimed carbide powder component in an amount of at least 70 weight percent of the grade powder composition, the reclaimed carbide component comprising electrochemically processed sintered carbide scrap, wherein the electrochemically processed sintered carbide scrap has an average particle size of 0.5 µm to 15 µm, and comprises 99.5 wt. % carbide.

2. The grade powder composition of claim 1, wherein the electrochemically processed sintered carbide scrap comprises tungsten carbide.

3. The grade powder composition of claim 2, wherein the electrochemically processed sintered carbide scrap further comprises at least one metal carbide selected from the group consisting of Group IVB metal carbides, Group VB metal carbides and Group VIB metal carbides.

4. The grade powder composition of claim 1, wherein the electrochemically processed sintered carbide scrap has an average particle size of 1 µm to 5 µm.

5. The grade powder composition of claim 1, wherein the reclaimed carbide powder component is present in an amount of 75-99 weight percent of the grade powder composition.

6. The grade powder composition of claim 1, wherein the reclaimed carbide powder component is present in an amount of 90-99 weight percent of the grade powder composition.

7. The grade powder composition of claim 1, wherein the reclaimed carbide powder component consists essentially of the electrochemically processed sintered carbide scrap.

8. The grade powder composition of claim 1 further comprising powder metallic binder.

9. The grade powder composition of claim 8, wherein the powder metallic binder is present in an amount of 1-30 weight percent of the grade powder composition.

10. The grade powder composition of claim 1 further comprising a virgin carbide powder component.

11. The grade powder composition of claim 1, wherein the reclaimed carbide component comprises electrochemically processed sintered carbide scrap in an amount of 60-90 weight percent, and a balance of zinc processed sintered carbide scrap and/or ammonium paratungstate processed sintered carbide scrap.

12. A method of making a sintered cemented carbide article comprising:
providing the grade powder composition as recited in claim 1;
forming the grade powder composition into a green article; and
sintering the green article to provide the sintered cemented carbide article.

13. The method of claim 12, wherein providing the grade powder composition comprises milling the reclaimed carbide component with a metallic binder.

14. The method of claim 13, wherein the electrochemically processed sintered carbide scrap comprises tungsten carbide.

15. The method of claim 12, wherein the reclaimed carbide powder component is present in an amount of 90-99 weight percent of the grade powder composition.

16. The method of claim 12, wherein the reclaimed carbide powder component consists essentially of the electrochemically processed sintered carbide scrap.

17. The method of claim 12, wherein the grade powder composition further comprises at least one metal carbide selected from the group consisting of Group IVB metal carbides, Group VB metal carbides and Group VIB metal carbides.

18. The method of claim 12, wherein the reclaimed carbide component comprises electrochemically processed sintered carbide scrap in an amount of 60-90 weight percent, and a balance of zinc processed sintered carbide scrap and/or ammonium paratungstate processed sintered carbide scrap.

19. The method of claim 18, wherein the sintered cemented carbide article has fracture toughness of 5-20 ksi (in)$^{1/2}$.

20. The method of claim 18, wherein the sintered cemented carbide article has transverse rupture strength of 250-650 ksi.

* * * * *